United States Patent
Huang et al.

(10) Patent No.: US 12,066,218 B2
(45) Date of Patent: Aug. 20, 2024

(54) SOLUTION-PROCESSED SELECTIVE SOLAR ABSORPTION COATINGS AND METHODS OF PREPARATION THEREOF

(71) Applicant: The Hong Kong University of Science and Technology, Hong Kong (CN)

(72) Inventors: Baoling Huang, Hong Kong (CN); Yang Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 16/947,516

(22) Filed: Aug. 5, 2020

(65) Prior Publication Data

US 2021/0063055 A1 Mar. 4, 2021

Related U.S. Application Data

(60) Provisional application No. 62/922,776, filed on Aug. 28, 2019.

(51) Int. Cl.
| | |
|---|---|
| *C09D 5/00* | (2006.01) |
| *C09D 1/00* | (2006.01) |
| *C09D 5/33* | (2006.01) |
| *C09D 7/40* | (2018.01) |
| *F24S 70/225* | (2018.01) |
| *F24S 70/30* | (2018.01) |
| *H02S 10/30* | (2014.01) |

(52) U.S. Cl.
CPC .............. *F24S 70/225* (2018.05); *C09D 1/00* (2013.01); *C09D 5/004* (2013.01); *C09D 5/006* (2013.01); *C09D 7/67* (2018.01); *C09D 7/68* (2018.01); *F24S 70/30* (2018.05); *H02S 10/30* (2014.12)

(58) Field of Classification Search
CPC ... C08K 3/14; C08K 3/28; C08K 3/38; C09D 1/00; C09D 5/004; C09D 5/006; C09D 5/32; C09D 7/61; C09D 7/67; C09D 7/68; F24S 70/225; F24S 70/25; F24S 70/30

See application file for complete search history.

(56) References Cited

U.S. PATENT DOCUMENTS

| | | |
|---|---|---|
| 4,937,137 A | 6/1990 | Kagechi et al. |
| 7,585,568 B2 | 9/2009 | Barshilia et al. |
| 7,909,029 B2 | 3/2011 | Kuckelkorn et al. |
| 8,893,711 B2 | 11/2014 | Kennedy |
| 9,469,896 B2 | 10/2016 | Antonaia et al. |
| 9,476,115 B2 | 10/2016 | Chandra |
| 9,726,402 B2 | 8/2017 | Chandra et al. |

(Continued)

FOREIGN PATENT DOCUMENTS

| | | | |
|---|---|---|---|
| CN | 102121757 A | * | 7/2011 |
| CN | 102122006 A | * | 7/2011 |

(Continued)

OTHER PUBLICATIONS

Machine translation of CN101598468A, retrieved Nov. 5, 2021. (Year: 2011).*

(Continued)

*Primary Examiner* — Callie E Shosho
*Assistant Examiner* — Krupa Shukla
(74) *Attorney, Agent, or Firm* — S&F/WEHRW

(57) ABSTRACT

The present disclosure provides a solution-processed selective solar absorption coating and a process for the preparation thereof.

19 Claims, 3 Drawing Sheets

(56) References Cited

U.S. PATENT DOCUMENTS

| | | | | |
|---|---|---|---|---|
| 2003/0148146 | A1* | 8/2003 | Kubota | C23C 14/0688 |
| | | | | 428/697 |
| 2006/0269731 | A1* | 11/2006 | Yoshikawa | B32B 17/10018 |
| | | | | 359/359 |
| 2008/0017835 | A1* | 1/2008 | Takahashi | C04B 35/62807 |
| | | | | 252/519.12 |
| 2012/0224256 | A1* | 9/2012 | Dasbach | B23K 26/18 |
| | | | | 359/350 |
| 2016/0003498 | A1* | 1/2016 | Kusiaku | C25D 5/627 |
| | | | | 205/198 |
| 2022/0143691 | A1* | 5/2022 | Gatalo | B22F 1/054 |

FOREIGN PATENT DOCUMENTS

| | | | | |
|---|---|---|---|---|
| CN | 101598468 | B | | 11/2011 |
| CN | 101818328 | B | | 5/2012 |
| CN | 102967072 | A | * | 3/2013 ............ C23C 14/0641 |
| CN | 103234293 | B | | 5/2015 |
| CN | 106546011 | A | * | 3/2017 |
| CN | 106813408 | A | * | 6/2017 |
| CN | 107192150 | A | * | 9/2017 |
| CN | 109631370 | A | | 4/2019 |
| EP | 107412 | A | * | 5/1984 ............ F24S 10/45 |
| JP | 2005179121 | A | * | 7/2005 |
| WO | 2013/088451 | A1 | | 6/2013 |
| WO | WO-2016155407 | A1 | * | 10/2016 ............ B32B 15/04 |

OTHER PUBLICATIONS

Machine translation of JP-2005179121-A, retrieved Nov. 6, 2021. (Year: 2005).*
Machine translation of CN-102967072-A, retrieved Feb. 24, 2023. (Year: 2013).*
Machine translation of CN-102121757-A, retrieved Mar. 9, 2023. (Year: 2011).*
Machine translation of CN-102122006-A, retrieved Mar. 9, 2023. (Year: 2011).*
Machine translation of CN-106546011-A, retrieved Sep. 1, 2023. (Year: 2017).*
Machine translation of CN-106813408-A, retrieved Sep. 1, 2023. (Year: 2017).*
Machine translation of CN-107192150-A, retrieved Sep. 1, 2023. (Year: 2017).*
L. Kaluza et al., "Sol-gel derived CuCoMnOx spinel coatings for solar absorbers: Structural and optical properties", Solar energy materials & Solar cells, 2001, 70, 187-201.
J. Vince et al., "Solar absorber coatings based on CoCuMnOx spinels prepared via the sol-gel process: structural and optical properties", Solar energy materials & Solar cells, 2003, 79, 313-330.
T. Bostrom et al., "Solution-chemical derived nickel-alumina coatings for thermal solar absorbers", Solar energy, 2003, 74, 497-503.
T. Bostrom et al., "Optimization of a solution-chemically derived solar absorbing spectrally selective surface", Solar energy materials & Solar cells, 2007, 91, 38-43.
X. Wang et al., "High-performance solution-processed plasmonic Ni nanochain-Al2O3 selective solar thermal absorbers", Applied physics letters, 2012, 101, 203109.
X. Yu et al., "Oxidation-resistant, solution-processed plasmonic Ni nanochain-SiOx (x < 2) selective solar thermal absorbers", Journal of Applied Physics, 2014, 116, 073508.
A. Amri et al., "Developments in the synthesis of flat plate solar selective absorber materials via sol-gel methods:A review", Renewable and Sustainable Energy Reviews, 2014, 36, 316-328.
F. Cao et al., A high-temperature stable spectrally-selective solar absorber based on cermet of titanium nitride in SiO2 deposited on lanthanum aluminate, Solar Energy Materials & Solar Cells, 2017, 160, 12-17.
Z. Wu et al., "Enhanced spectral selectivity through the quasi-optical microcavity based on W—SiO2 cermet", Materials Today Physics, 2019, 9, 100089.
L. Hao et al., "Preparation and thermal stability on non-vacuum high temperature solar selective absorbing coatings", Chinese Science Bulletin, 2009, 54(8): 1451-1454, doi: 10.1007/s11434-009-0159-6.
A. Schuler et al., "Structural and optical properties of titanium aluminum nitride films (Ti1—xAxAlxN)", Journal of Vacuum Science & Technology A, 2001, 19(3), 922-929, doi: 10.1116/1.1359532.
K. Zhang et al., "A review on thermal stability and high temperature induced ageing mechanisms of solar absorber coatings", Renewable and Sustainable Energy Reviews, 2017, 67, 1282-1299.
First Office Action with Search Report of CN202010775417.0 issued by the China National Intellectual Property Administration (CNIPA) of the PRC on Dec. 3, 2021.

* cited by examiner

SOLUTION-PROCESSED SELECTIVE SOLAR ABSORPTION COATINGS AND METHODS OF PREPARATION THEREOF

CROSS REFERENCE TO RELATED APPLICATIONS

This application claims the benefit of priority of U.S. Provisional Application No. 62/922,776 filed on Aug. 28, 2019, which is hereby incorporated by reference in its entirety.

TECHNICAL FIELD

The present disclosure generally relates to selective solar absorption materials, and more particularly, to solution-processed selective solar absorption coatings that can be used in solar thermal energy conversion systems, such as concentrating solar power, solar thermophotovoltaics, heating and solar steam generation, and to a process for fabricating such absorbers.

BACKGROUND

Spectrally selective solar absorption coatings are the key components in solar thermal energy conversion systems, such as concentrated solar power, solar thermophotovoltaics, and solar steam generation, to achieve high energy conversion efficiency. An ideal selective solar absorption coating can perfectly absorb sunlight in the visible-NIR range, but perfectly reflect light with longer wavelengths to avoid heat losses from thermal re-radiation. The cut-off wavelength strongly depends on the operating temperature of the absorber and the solar concentration ratio. Both a larger concentration ratio and a lower operating temperature will lead to a larger cut-off wavelength. The solar-thermal energy conversion efficiency r of selective solar absorbers can be defined with the following equation:

$$\eta = \bar{\alpha} - \frac{\bar{\varepsilon}\sigma T^4}{CI_{solar}} \quad (1)$$

where $\bar{\alpha}$ and $\bar{\varepsilon}$ are the spectrally averaged solar absorptance and the spectrally averaged thermal emittance of the selective absorbers, respectively. C and T are the solar concentration ratio and the operating temperature of selective absorbers, respectively. $I_{solar}$ is the total solar radiation, which is 1000 W/m² for AM 1.5 G. To maximize the solar-thermal energy conversion efficiency η under given conditions, selective solar absorbers should have a high solar absorptance and a low thermal emittance simultaneously.

According to the Carnot efficiency theory, to achieve high electricity generation efficiency, solar-thermal systems are expected to operate at high temperatures, saying above 673 K. However, high temperatures will bring the emission spectrum of the black body close to that of the solar irradiation (0.3 to 2.5 m), resulting in considerable overlapping. The total emission power of the black body also becomes larger with the increase of temperatures. Moreover, high operating temperatures require selective solar absorption coatings with excellent thermal stability. Last but not least, scalable selective solar absorbers manufactured by facile and low-cost methods are preferable due to their great potential for large-scale deployment. In short, a spectrally selective, thermally stable, and low-cost solar absorber is the best choice for any solar thermal energy conversion systems.

Over the past decades, a broad variety of selective solar absorption coatings have been explored, at least including intrinsic absorbers, semiconductor-metal tandems, ceramic metal composites (cermets), multilayer metal/ceramic nano-films, photonic crystals, and plasmonic metamaterials.[1] However, almost all state-of-the-art selective solar absorbers are manufactured by costly high-vacuum techniques, such as physical vapor deposition, chemical vapor deposition, and various lithographic methods.

Conventional methods (U.S. Pat. No. 7,585,568B2; U.S. Pat. No. 7,909,029B2; U.S. Pat. No. 8,893,711B2; U.S. Pat. No. 9,476,115B2; U.S. Pat. No. 9,726,402B2; WO2013088451A1; US20160003498A1; CN101598468B; CN101818328B; CN102602071B) produce selective solar absorption coatings with high solar-thermal energy conversion efficiency and excellent thermal stability, but their high-vacuum fabrication processes are relatively complex and expensive for large-scale production.

Compared to high-vacuum deposition techniques, solution-based processes, such as spin coating, spray coating, and painting, are much simpler and lower in cost. Selective solar absorption coatings prepared by solution-based methods have attracted a considerable research interest recently. Solution-processed selective solar absorption coatings comprising transition metal carbides have been developed, but the resin binder used in the preparation is not thermally stable at high temperatures (U.S. Pat. No. 4,937,137A). Solution-processed selective solar absorbers of $CuCoMoO_x$ and $Ni-Al_2O_3$ were reported to exhibit solar absorptances >90% and thermal emittances <10% at temperatures of <373 K; however, their thermal stability (<673 K) is far from satisfactory for high temperature applications.[2,3,4]

Pyromark 2500, a commercial high-temperature paint for solar-thermal systems, displays a high solar absorptance of 97% and a high operating temperatures up to 900 K, but its absorption in the mid-infrared range is also very high (80~100%), resulting an unwanted high thermal emittance of 80% at room temperature and 90% at 1,173 K, respectively. More recently, a black solar absorber made of cermet $Co_3O_4-SiO_2$ was fabricated by a solution process, which showed high solar absorptance (>90%) and great thermal stability (1,023 K). Similarly, this solar absorber showed no selectivity in sunlight absorption.

There thus exists a need to develop improved selective solar absorption coatings and solution-based methods for the preparation thereof.

SUMMARY

An objective of the present disclosure is to address at least some of the deficiencies of conventional solution-processed selective solar absorption coatings, such as poor spectral selectivity and thermal instability. Accordingly, the present disclosure provides a solution-processed selective solar absorption coating comprising an infrared reflector, an absorptive coating comprising ceramic nanoparticles selected from the group consisting of transition metal nitrides, transition metal borides, transition metal carbides, and mixtures thereof; and an anti-reflection coating, showing excellent spectral selectivity and excellent long-term thermal stability up to 1,000 K, and methods for the preparation thereof.

In a first aspect, provided herein is a selective solar absorption coating comprising: an infrared reflecting coating; an absorptive coating comprising ceramic nanoparticles selected from the group consisting of transition metal nitrides, transition metal borides, transition metal carbides, and mixtures thereof disposed on a surface of the infrared reflecting coating; and an $SiO_2$ antireflection coating disposed on the surface of the absorptive coating, wherein the absorptive coating is prepared from solution-processable ceramic nanoparticles.

In a first embodiment of the first aspect, provided herein is the selective solar absorption coating of the first aspect, wherein the ceramic nanoparticles are selected from the group consisting of $TiN_x$, $Al_wTi_zN$, $ZrN_x$, $Al_wZr_zN$, TiC, ZrC, $TiN_xC_y$, $ZrN_xC_y$, $TiN_xO_y$, $ZrN_xO_y$, TiN, ZrN, $TiB_2$, and $ZrB_2$, wherein $0<w<1$, $0.5 \le x \le 1.5$, $0 \le y \le 1$, and $0<z<1$.

In a second embodiment of the first aspect, provided herein is the selective solar absorption coating of the first aspect, wherein the ceramic nanoparticles have an average diameter of 10-500 nm and the thickness of the absorptive coating is 10-500 nm.

In a third embodiment of the first aspect, provided herein is the selective solar absorption coating of the first aspect, wherein the infrared reflecting coating comprises at least one material selected from the group consisting of a metallic material and a ceramic material; and the infrared reflecting coating has a thickness greater than 50 nm.

In a fourth embodiment of the first aspect, provided herein is the selective solar absorption coating of the first aspect, wherein the $SiO_2$ antireflection coating has a thickness of 10-500 nm.

In a firth embodiment of the first aspect, provided herein is the selective solar absorption coating of the first aspect further comprising a substrate, wherein the infrared reflecting coating is disposed on the surface of the substrate.

In a sixth embodiment of the first aspect, provided herein is the selective solar absorption coating of the first aspect, wherein the selective solar absorption coating comprises: an infrared reflecting coating comprising at least one material selected from the group consisting of a metallic material and a ceramic material, wherein the infrared reflecting coating has a thickness greater than 50 nm; an absorptive coating disposed on a surface of the infrared reflecting coating, wherein the absorptive coating comprises ceramic nanoparticles selected from the group consisting of $TiN_x$, $Al_wTi_zN$, $ZrN_x$, $Al_wZr_zN$, TiC, ZrC, $TiN_xC_y$, $ZrN_xC_y$, $TiN_xO_y$, $ZrN_xO_y$, $TiB_2$, and $ZrB_2$, wherein $0<w<1$, $0.5 \le x \le 1.5$, $0 \le y \le 1$, and $0<z<1$; the ceramic nanoparticles have an average diameter of 10-500 nm; and the absorptive coating has a thickness of 10-500 nm; and an $SiO_2$ antireflection coating disposed on the surface of the absorptive coating, wherein the $SiO_2$ antireflection coating has a thickness of 10-500 nm, wherein the absorptive coating and the $SiO_2$ antireflection coating are each independently prepared using solution-processable starting materials.

In a second aspect, provided herein is a solar thermal energy conversion system comprising the selective solar absorption coating of the first aspect.

In a third aspect, provided herein is a method for preparing the selective solar absorption coating of the first aspect, the method comprising: providing the infrared reflecting coating; applying a first solvent comprising the ceramic nanoparticles onto an exposed surface of the infrared reflecting coating thereby forming the absorptive coating disposed on the infrared reflecting coating; and depositing $SiO_2$ onto an exposed surface of the absorptive coating thereby forming a $SiO_2$ antireflection coating, wherein each of the first solvent applied using a solution-based method.

In a first embodiment of the third aspect, provided herein is the method of the third aspect, wherein the solution-based method comprises at least one method selected from the group consisting of spin coating, spray coating, and painting.

In a second embodiment of the third aspect, provided herein is the method of the third aspect, wherein the first solvent comprises a colloidal dispersion of the ceramic nanoparticles selected from the group consisting of $TiN_x$, $Al_wTi_zN$, $ZrN_x$, $Al_wZr_zN_y$, TiC, ZrC, $TiN_xCy$, $ZrN_xC_y$, $TiN_xO_y$, $ZrN_xO_y$, $TiB_2$, and $ZrB_2$, wherein $0<w<1$, $0.5 \le x \le 1.5$, $0 \le y \le 1$, and $0<z<1$.

In a third embodiment of the third aspect, provided herein is the method of the third aspect, wherein the ceramic nanoparticles have an average diameter of 10-500 nm and the thickness of the absorptive coating is 10-500 nm.

In a fourth embodiment of the third aspect, provided herein is the method of the third aspect, wherein the infrared reflecting coating comprises at least one material selected from the group consisting of metals and ceramics; and the infrared reflecting coating has a thickness greater than 50 nm.

In a fifth embodiment of the third aspect, provided herein is the method of the third aspect, wherein the $SiO_2$ antireflection coating has a thickness of 10-500 nm.

In a sixth embodiment of the third aspect, provided herein is the method of the third aspect, wherein the step of depositing $SiO_2$ on the surface of the absorptive coating comprises applying a second solvent comprising a $SiO_2$ precursor onto an exposed surface of the absorptive coating thereby forming a $SiO_2$ precursor coating disposed on the absorptive coating; and curing the $SiO_2$ precursor coating thereby forming an $SiO_2$ anti-reflection coating disposed on the absorptive coating In a seventh embodiment of the third aspect, provided herein is the method of the sixth embodiment of the third aspect, wherein the $SiO_2$ precursor is perhydropolysilazane (PHPS) and the step of curing the $SiO_2$ precursor comprises reaction of PHPS with water and oxygen.

In an eighth embodiment of the third aspect, provided herein is the method of the third aspect, wherein the method comprises: providing the infrared reflecting coating; applying a first solvent comprising TiN ceramic nanoparticles onto an exposed surface of the infrared reflecting coating thereby forming the absorptive coating disposed on the infrared reflecting coating, wherein the TiN ceramic nanoparticles have an average diameter of 10-500 nm and thickness of the infrared reflecting coating is 10-500 nm; applying a second solvent comprising PHPS onto an exposed surface of the absorptive coating thereby forming a PHPS coating disposed on the absorptive coating; and contacting the PHPS coating with oxygen and water thereby forming an $SiO_2$ anti-reflection coating having a thickness of 50-500 nm disposed on the absorptive coating, wherein each of the first solvent and the second solvent is independently applied using a solution-based method.

In a ninth embodiment of the third aspect, provided herein is the method of the eighth embodiment of the third aspect, wherein each of the first solvent and the second solvent is independently an organic solvent.

In a tenth embodiment of the third aspect, provided herein is the method of the eighth embodiment of the third aspect, further comprising the steps of: removing the first solvent at a temperature between 20-200° C. after the step of applying the first solvent comprising TiN ceramic nanoparticles onto an exposed surface of the infrared reflecting coating; and removing the second solvent at a temperature between 20-400° C. after the step of applying a second solvent comprising PHPS onto an exposed surface of the absorptive coating.

In a fourth aspect, provided herein is a selective solar absorption coating prepared according to the method of the third aspect.

In a fourth aspect, provided herein is a selective solar absorption coating prepared according to the method of the eighth embodiment of the third aspect.

The selective solar absorption coating can comprise a titanium nitride infrared reflecting coating, which can offer a solar absorptance of 95%, and a thermal emittance of 3% at 300 K and 22% at 1,000 K. Furthermore, the selective solar absorption coating is thermally stable up to 1,000 K in vacuum after long-term (150 hours) thermal testing.

The process for the preparation is solution-based method, which is quite simple and low-cost, showing great potential for the large-scale fabrication of selective solar absorption coatings.

The selective solar absorption coatings described herein comprise solution-processed absorptive coatings made of colloidal ceramic nanoparticles selected from the group consisting of transition metal nitrides, transition metal borides, transition metal carbides, and mixtures thereof, which can strongly absorb solar radiation and convert it into thermal energy, yet strongly reflect the infrared light to avoid heat losses from thermal re-radiation. The colloidal ceramic nanoparticles are coated onto an infrared reflecting coating to from a uniform absorptive coating for sunlight absorption. The great dispersion of the colloidal ceramic nanoparticles ensures the uniformity of the absorptive coating. The absorption bandwidth or the cut-off wavelength can be adjusted by controlling the thickness of the absorptive coating. Specifically, the thickness of the absorptive coating is tuned by the concentration of the colloidal ceramic nanoparticles or the parameters of the coating process.

The present disclosure also provides a $SiO_2$ antireflection and surface protective coatings. The method of preparing the $SiO_2$ antireflection coating is not limited to a particular method and all methods known in the art for depositing a $SiO_2$ coating are contemplated by the present disclosure. In certain embodiments, the $SiO_2$ coating is derived from a solution processable $SiO_2$ precursor, such as perhydropolysilazane (PHPS), by reacting with water (e.g., vapor) and oxygen in the environment. The preparation can be conducted at either room temperature or higher temperatures. The $SiO_2$ antireflection coating further enhances the absorption in a broad band by reducing the surface reflection. In addition, the adding the $SiO_2$ antireflection coating can also serve to immobilize the ceramic nanoparticles in the absorptive coating, improve the stability of the absorber at high temperatures, and also increase the hydrophobic properties of the coated surface. Compared to $SiO_2$ thin films prepared by chemical vapor deposition, using a solution processable $SiO_2$ precursor, such as PHPS, has many advantages, including a lower processing temperature, higher thermal stability, greater surface hydrophobicity, and lower processing costs.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The present disclosure provides a selective solar absorption coating comprising: an infrared reflecting coating; an absorptive coating comprising ceramic nanoparticles selected from the group consisting of transition metal nitrides, transition metal borides, transition metal carbides, and mixtures thereof disposed on a surface of the infrared reflecting coating; and a $SiO_2$ antireflection coating disposed on the surface of the absorptive coating. Advantageously, the absorptive coating and the $SiO_2$ antireflection coating can be prepared from solution-processable starting materials, which provide an economic means for producing selective solar absorption described herein as compared with conventionally used deposition methods for preparing existing selective solar absorption coatings.

As used herein, "solution-processable" refers to materials or compositions that can be used in various solution-phase processes including spin coating, printing (e.g., inkjet printing, gravure printing, offset printing and the like), spray coating, electrospray coating, drop casting, dip coating, blade coating, and the like.

Figure 1:
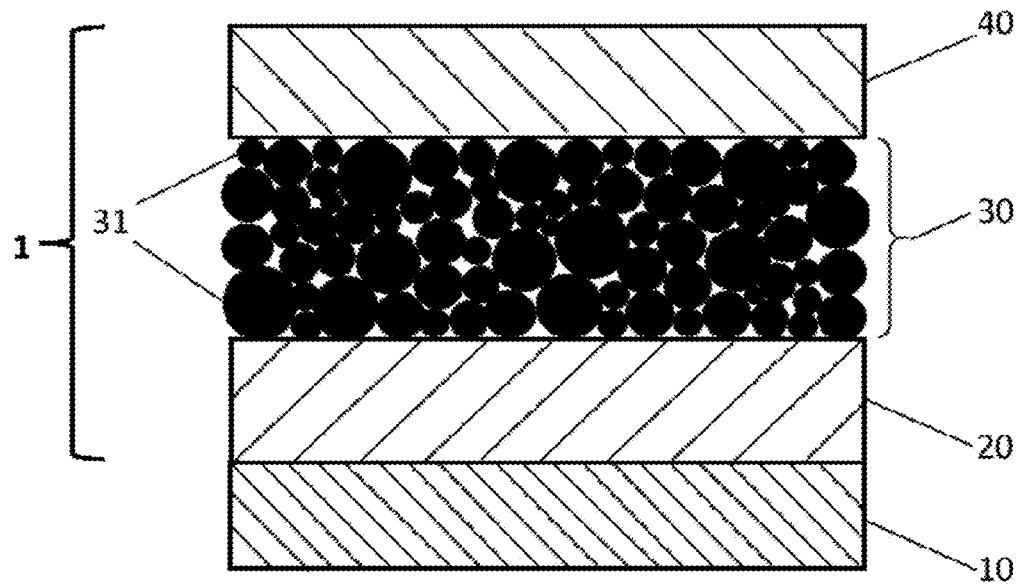
FIG. 1 shows a cross-sectional schematic of a solution-processed selective solar absorber in accordance with certain embodiments described herein.

An exemplary cross-sectional schematic of the selective solar absorption coating described herein is shown in FIG. 1. From bottom to top, the selective solar absorber 1 can comprise an optional substrate 10, an infrared reflecting coating 20, an absorptive coating 30 comprising ceramic nanoparticles 31, and a $SiO_2$ anti-reflection coating 40.

The substrate 10 can be used to support the selective solar absorption coating 1. The substrate 10 can comprise any conventional substrate material, such as stainless steel (e.g., 304, 310, 316 and 321), glass, copper, aluminum, silicon, and mixtures thereof. The substrate 10 can be tubular, planar, curved, or any other shape. It should be pointed out here that the nature of the substrate 10 is not critical in the overall structure and that the selective solar absorber 1 and any conventional substrate used in the field of solar thermal energy conversion systems can be used to support the selective solar absorption coating 1.

The infrared reflecting coating 20 can be used to reflect the infrared light to the free space for minimizing the heat losses from infrared re-emission. Besides, the infrared reflecting coating 20 can also absorb some solar photons in the visible-near infrared (NIR) range due to its intrinsic absorption, while reflecting other visible-NIR-range photons to the top coatings for increasing the optical path length of photons. The infrared reflecting coating 20 can comprise a reflective material selected from the group consisting of metallic materials, ceramic materials, and combinations thereof that exhibit strong reflection in the infrared region. In certain embodiments, the infrared reflecting coating comprises a metallic material selected from the group consisting of silver, gold, aluminum, chrome, molybdenum, copper, nickel, titanium, niobium, tantalum, tungsten, palladium, a mixture of two or more thereof and an alloy thereof. For instance, Au, Ag, Cu, Al, stainless steel, and combinations thereof are suitable for low temperature applications. For higher temperature application, the infrared reflecting coating 20 can comprise refractory metals such as W, Mo, Ta, Zr, Ni, and Ti, or refractory ceramics such as nitrides, carbides, and borides of transition metals (Ti, Zr, Ta, Nb, W, and Hf), and combinations thereof. In addition, the infrared reflecting coating 20 can be non-flexible or flexible. The thickness of the infrared reflecting coating 20 is typically larger than 50 nm. In certain embodiments, the thickness of the infrared reflecting coating 20 is 50 to 300 nm or 100 to 200 nm.

In certain embodiments, the infrared reflecting coating has a high reflectance for infrared with a wavelength longer than 2.5 microns. In certain embodiments, the infrared reflecting coating reflects 85% to 100% of light with a wavelength of 2.5 microns to 20 microns.

In instances in which the mechanical/physical properties of the infrared reflecting coating 20 allow, it can also function as a substrate. In such embodiments, the substrate 10 is optional.

The present disclosure also provides a solution-processed absorptive coating 30 comprising the ceramic nanoparticles 31, which can strongly absorb solar radiation and convert it into thermal energy and show no infrared light absorption (or emission) to avoid heat losses from thermal re-radiation. The ceramic nanoparticles can comprise a group IVB, VB, or VIB transition metal. In certain embodiments, the ceramic nanoparticles are selected from the group consisting of $TiN_x$, $ZrN_x$, $HfN_x$, $VN_x$, $NbN_x$, $TaN_x$, $CrN_x$, $MoN_x$, $WN_x$, $TiN_xO_y$, $ZrN_xO_y$, $HfN_xO_y$, $VN_xO_y$, $NbN_xO_y$, $TaN_xO_y$, $CrN_xO_y$, $MoN_xO_y$, $WN_xO_y$, $TiC_x$, $ZrC_x$, $HfC_x$, $VC_x$, $NbC_x$, $TaC_x$, $CrC_x$, $MoC_x$, $WC_x$, $TiN_xC_y$, $ZrN_xC_y$, $HfN_xC_y$, $VN_xC_y$, $NbN_xC_y$, $TaN_xC_y$, $CrN_xC_y$, $MoN_xC_y$, $WN_xC_y$, $Al_wZr_zN$, $Al_wTi_zN$, TiN, ZrN, $TiB_2$, $ZrB_2$, $HfB_2$, $VB_2$, $NbB_2$, $TaB_2$, $CrB_2$, $MoB_2$, $WB_2$, and mixtures thereof, wherein $0<w<1$, $0.5 \le x \le 1.5$, $0 \le y \le 1$, and $0<z<1$. In certain embodiments, the absorptive coating does not comprise a cermet. In certain embodiments, the absorptive coating or the ceramic nanoparticles do not comprise aluminum. In certain embodiments, the absorptive coating or the ceramic nanoparticles do not comprise ZrNAl, ZrAlNO, TiNAl or TiAlNO. The size of the ceramic nanoparticles 31 can be in the range of 10-500 nm. In certain embodiments, the size range of the ceramic nanoparticles is around 10-100 nm. The ceramic nanoparticles 31 can be any shape, such as sphere, rod, star, irregular, and combinations thereof.

The ceramic nanoparticles 31 can be deposited onto the infrared reflecting coating 20 thereby forming a uniform absorptive coating 30 for sunlight absorption. Solution-based methods such as spin coating, spray coating and painting can be used for deposition. In certain embodiments, the ceramic nanoparticles are colloidal ceramic nanoparticles. The high dispersion of the colloidal ceramic nanoparticles 31 can ensure the uniformity of the absorptive coating 30. The absorption bandwidth or the cut-off wavelength can be adjusted by controlling the thickness of the absorptive coating 30. To achieve good spectral selectivity, the thickness of the absorptive coating 30 typically ranges between 10-500 nm. The optimal thickness depends on the operational conditions, generally 50-200 nm.

In certain embodiments, the selective solar absorption coating 1 can comprise more than one absorptive coating 30. In such instances, the selective solar absorption coating can comprise 2, 3, 4, 5, 6, 7, 8, 9, 10 or more coatings of the absorptive coating 30 coated on the surface on each successive surface of the absorptive coating.

The present disclosure also provides a $SiO_2$ antireflection coating 40 disposed on the surface of the absorptive coating, which also serves as a surface protective coating. In certain embodiments, the $SiO_2$ antireflection coating 40 can be derived from solution-processable starting materials. The thickness of the $SiO_2$ antireflection coating 40 typically ranges between 10-500 nm. The optimal thickness of the $SiO_2$ antireflection coating 40 can range between 30-150 nm for different conditions.

The $SiO_2$ antireflection coating 40 can further enhance the absorption in a broad band by reducing surface reflection. In addition, adding the $SiO_2$ antireflection coating 40 can improve the stability of the absorber especially at high temperatures, as well as its hydrophobic properties. Compared to $SiO_2$ thin films prepared using chemical vapor deposition, the PHPS-derived $SiO_2$ antireflection coating 40 exhibits many advantages, such as lower processing temperatures, higher thermal stability, greater hydrophobicity, and lower cost.

The topmost coating of the antireflective material can be textured to increase solar absorption and minimize surface reflection. Texturing can be accomplished by any suitable method, such as bombardment of the surface or etching.

Figure 5:
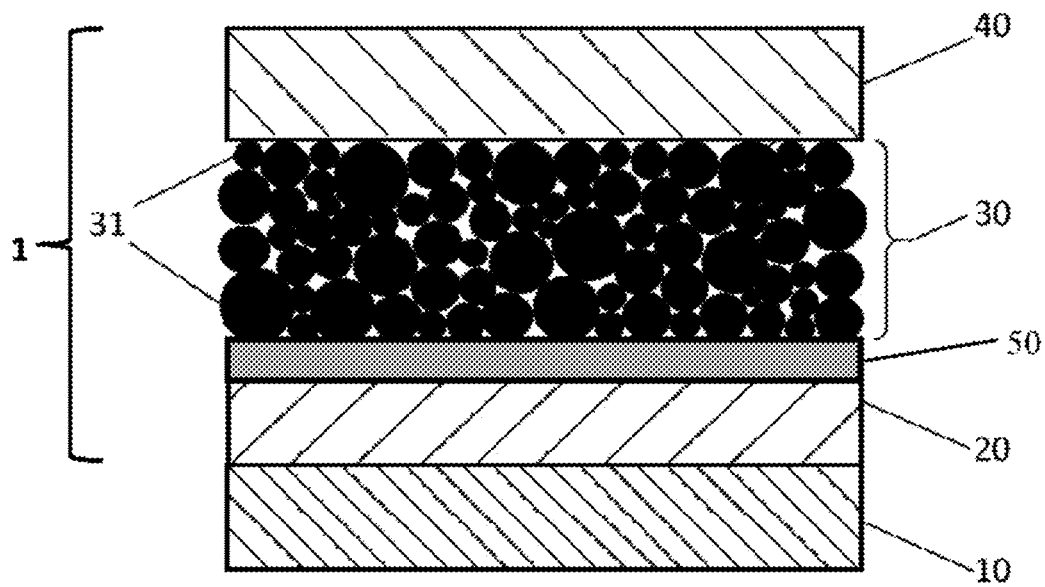
FIG. 5 shows a cross-sectional schematic of a solution-processed selective solar absorber further comprising an adhesion layer in accordance with certain embodiments described herein.

In certain embodiments, the selective solar absorption coating further comprises an adhesion layer 50 between the infrared reflecting coating 20 and the absorptive coating 30, wherein the adhesion layer exhibits transparency in the near infrared and infrared improves the adhesion of the absorptive coating to the infrared reflecting coating (FIG. 5). Materials suitable for preparing the adhesion layer, include, but are not limited to PHPS. The adhesion layer can vary in thickness between 5-50 nm.

Figure 6:
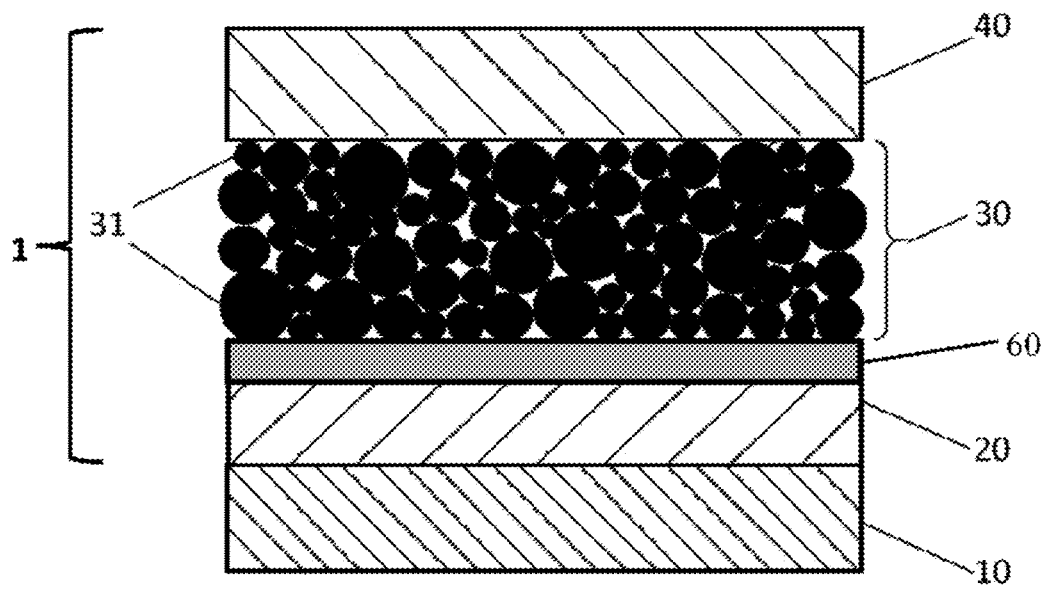
FIG. 6 shows a cross-sectional schematic of a solution-processed selective solar absorber further comprising a protective layer in accordance with certain embodiments described herein.

In certain embodiments, the selective solar absorption coating further comprises a protective layer 60 between the infrared reflecting coating 20 and the absorptive coating 30, wherein the protective layer exhibits transparency in the near infrared and infrared improves the resistance of the infrared coating to corrosion, oxidation and mechanical damage (FIG. 6). The protective layer can comprise $Al_2O_3$ or $SiO_2$. The protective layer can vary in thickness between 5-50 nm.

The selective solar absorber coating exhibit excellent photothermal and physical properties.

In certain embodiments, the selective solar absorber coatings described herein exhibit an absorptance of up to 95%. In certain embodiments, the absorptance of the selective solar absorber coating described herein can be range from 85-95%; 87-95%; 89-95%; 90-95%; 91-95%; 92-95%; 93-95%; or 94-95%.

The selective solar absorber coatings described herein can exhibit a thermal emittance of between 2-20% at 300 K. In certain embodiments, the selective solar absorber coatings described herein can exhibit a thermal emittance of between 15-40% at 1,000K.

The present disclosure also provides solar thermal energy conversion systems, such as concentrating solar power, solar thermophotovoltaics, heating and solar steam generation, comprising the selective solar absorber coatings described herein.

Figure 2:
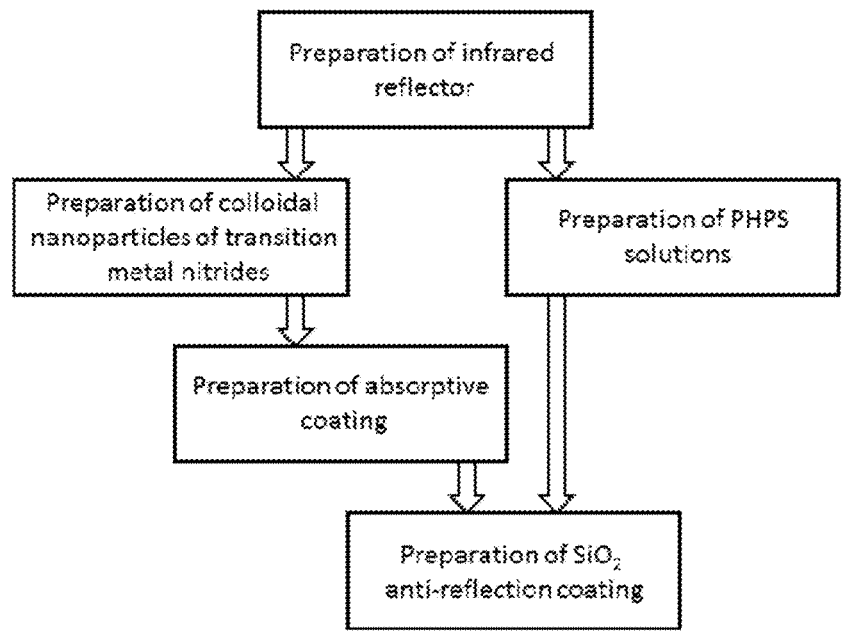
FIG. 2 shows a preparation process for a solution-processed selective solar absorption coating in accordance to certain embodiments described herein.

The present disclosure also provides a method for preparing the selective solar absorption coating 1. A schematic showing the steps of an exemplary method for preparing the selective solar absorption coating 1 is illustrated in FIG. 2. Advantageously, the methods for preparing the solar selective absorption coating described herein can comprise one or more cost effective solution-based deposition steps for depositing one or more of the absorptive coating 30 and optionally the $SiO_2$ antireflection coating 40. In certain embodiments, the method comprises: providing the infrared reflecting coating; applying a first solvent comprising the ceramic nanoparticles onto an exposed surface of the infrared reflecting coating thereby forming the absorptive coating disposed on the infrared reflecting coating; applying a second solvent comprising a $SiO_2$ precursor onto an exposed surface of the absorptive coating thereby forming a $SiO_2$ precursor coating disposed on the absorptive coating; and curing the $SiO_2$ precursor yielding $SiO_2$ and thereby forming an $SiO_2$ anti-reflection coating disposed on the absorptive coating, wherein each of the first solvent and the second solvent are independently applied using a solution-based method.

Methods for preparing the infrared reflecting coating are not limited to any specific method. As such, all known methods for preparing the infrared reflecting coating are contemplated by the present disclosure. In certain embodiments, the infrared reflecting coating is prepared by a physical deposition technique in vacuum in vapor phase (PVD, physical vapor deposition), such as thermal evaporation, electron gun, ionic implantation or "sputtering", by chemical deposition in vapor phase (CVD, chemical vapor deposition) or through electrolytic baths.

A first solvent comprising the ceramic nanoparticles 31 can be applied to an exposed surface of the infrared reflecting coating. The first solvent is not limited to any specific solvent. In general the first solvent can comprise an organic solvent, water, or mixtures thereof. In instances in which the first solvent comprises an organic solvent, the first solvent can be selected from alkane solvents, such as pentane, hexane, cyclohexane, heptanes, octane, nonane, decane, undecane, dodecane, tridecane, and tetradecane; aryls, such as toluene, xylene, mesitylene, trimethylbenzene, chlorobenzene, dichlorobenzene, trichlorobenzene, nitrobenzene, cyanobenzene, and the like; alcohols such as methanol, ethanol, propanol, butanol, and the like; ethers, such as tetrahydrofuran, tetrahydropyran, dibutyl ether, tertbutylethylether, tetrahydrofuran, and the like; N,N-dimethylformamide (DMF); acetonitrile; and combinations thereof. In certain embodiments, the first solvent comprises water, ethanol, polyethylene, polyethylene methyl ether, polypropylene, polypropylene methyl ether, a propylene glycol alkyl ether ester, such as propylene glycol methyl ether acetate (PGMEA), and mixtures thereof. In certain embodiments, the first solvent has a boiling point between 60-200° C.; 60-160° C.; 100-160° C.; 80-200° C.; 100-200° C.; 120-180° C.; or 140-160° C.

The concentration of the ceramic nanoparticles 31 in the first solvent can be from 1-70% w/w. In certain embodiments, the concentration of the ceramic nanoparticles 31 in the first solvent is 1-70%; 1-60%; 1-50%; 1-40%; 10-40%; 10-30%; 10-25%; or 15-25% w/w.

The first solvent can comprise a colloidal solution of the ceramic nanoparticles 31. Colloidal solutions of the ceramic nanoparticles 31 can be prepared using any conventional method known in the art for preparing colloidal solutions of metal nanoparticles. In certain embodiments, the colloidal solution is prepared by ultrasonic pre-dispersion of the ceramic nanoparticles and optionally using a method for reducing the particle size of the ceramic nanoparticles 31.

There are various known methods for reducing the particle size of substances and avoiding nanoparticle aggregation, including reduction by comminution or de-agglomeration by milling and/or sieving. Exemplary methods for particle reduction include, but are not limited to jet milling, hammer milling, compression milling and tumble milling processes (e.g., ball milling). Particle size control parameters for these processes are well understood by the person skilled in the art. For example the particle size reduction achieved in a jet milling process is controlled by adjusting a number of parameters, the primary ones being mill pressure and feed rate. In a hammer mill process, the particle size reduction is controlled by the feed rate, the hammer speed and the size of the opening in the grate/screen at the outlet. In a compression mill process, the particle size reduction is controlled by the feed rate and amount of compression imparted to the material (e.g. the amount of force applied to compression rollers).

In certain embodiments, the ceramic nanoparticles 31 are subjected to high-energy ball milling. In such instances, the ceramic nanoparticles can be pre-dispersed in any suitable solvent by ultrasonic treatment. After that, the pre-dispersed solution can be subjected to high-energy ball milling for e.g., 10 hours to obtain better dispersion. In certain embodiments, $ZrO_2$ balls of 0.05-5 mm sizes are used as grinding medium. The weight ratio of the balls and the materials can be 100:1-10:1. The milling speed can be controlled between 200-2000 rpm. The solution can be diluted to a desired concentration by adding additional volumes of the first solvent or adding volumes of other solvents thereby forming a first solvent comprising the ceramic nanoparticles. Then, the first solvent comprising the colloidal ceramic nanoparticles 31 can be deposited on the top of the infrared reflecting coating 20 by one more solution-based methods and optionally removing the first solvent thereby forming the absorptive coating disposed on the infrared reflecting coating.

Exemplary solution-based methods include, but are not limited to spin coating, spray coating, and painting. The thickness of the absorptive coating 30 can be tuned by the concentration of the ceramic nanoparticles 31 in the first solvent, modifying the coating conditions, e.g., the speed of the coating process, and/or applying multiple coatings of the absorptive coating 30.

The first solvent can be removed using any method known to those of skill in the art. In certain embodiments, the first solvent can be removed by one or more of the application of heat and reduced pressure. In certain embodiments, the first solvent is removed by heating at 60-200° C.; 60-160° C.; 100-160° C.; 80-200° C.; 100-200° C.; 120-180° C.; or 140-160° C.

In instances in which the selective solar absorption coating 1 comprises more than one absorptive coating 30, the step of applying the absorptive coating can be repeated. In such instances, the absorptive coating can be applied 2, 3, 4, 5, 6, 7, 8, 9, 10 or more times with each subsequent coating of the absorptive coating coated on the surface on the previously applied absorptive coating.

The preparation of the $SiO_2$ antireflection coating 40 is not limited to any specific method for $SiO_2$ deposition and any such method known to those skilled in the art may be used in connection with the methods described herein. In certain embodiments, the $SiO_2$ antireflection coating 40 is deposited using a CVD method, a sol-gel method, deposition of a $SiO_2$ precursor and chemical conversion of the $SiO_2$ precursor (e.g., by curing) to $SiO_2$, and the like may be used in the formation of the $SiO_2$ antireflection coating 40.

In certain embodiments, the $SiO_2$ precursor is a silicon-containing polymer, such as a polysilazane, a polysiloxane, a polysiloxazane or a polysilane. In certain embodiments, the polysilazane is PHPS. Additional $SiO_2$ precursors may include, tetralkyloxysilanes (e.g., tetramethoxysilane and tetraethoxysilane), orthosilicic acid, and the like.

The method for depositing the $SiO_2$ antireflection coating 40 can comprise applying a second solvent comprising the $SiO_2$ precursor onto the absorptive coating 30 thereby forming a $SiO_2$ precursor coating disposed on the absorptive coating 30; and curing the $SiO_2$ precursor to yield $SiO_2$ and thereby forming the $SiO_2$ antireflection coating 40.

The concentration of $SiO_2$ precursor in the second solvent can be from 1-80% w/w. In certain embodiments, the concentration of the $SiO_2$ precursor in the second solvent is 1-80%; 1-70%; 1-60%; 1-50%; 1-40%; 1-30%; 1-20%; 1-10%; 2-8%; or 4-6% w/w.

The second solvent can be an organic solvent, such as alkanes, aryls, alcohols, ethers, halogenated solvents, dialkyl ketones, esters, formamides, and mixtures thereof. Exemplary second solvents can comprise include alkane solvents, such as pentane, hexane, cyclohexane, heptanes, octane, nonane, decane, undecane, dodecane, tridecane, and tetradecane; aryls, such as toluene, xylene, mesitylene, trimethylbenzene, chlorobenzene, dichlorobenzene, trichlorobenzene, nitrobenzene, cyanobenzene, and the like; alcohols such as methanol, ethanol, propanol, butanol, and the like; ethers, such as tetrahydrofuran, tetrahydropyran, dibutyl ether, tertbutylmethylether, propylene glycol methoxy ether (PGME), propylene glycol monomethyl ether acetate (PGMEA), tetrahydrofuran, and the like; N,N-dimethylformamide (DMF); acetonitrile; and combinations thereof.

Once the $SiO_2$ precursor solution is deposited onto the surface of the absorptive coating 30 by a solution-processed method, such as spin coating, spray coating, and painting, it can then be cured to yield $SiO_2$ and thereby form the $SiO_2$ antireflection coating 40. The step of curing the $SiO_2$ precursor can comprise at least one of heating the $SiO_2$ precursor, reacting the $SiO_2$ precursor with water, and reacting the $SiO_2$ precursor with oxygen. In certain embodiments, the step of curing the $SiO_2$ precursor comprises heating the $SiO_2$ precursor in air (e.g., in the presence of oxygen and water vapor).

In certain embodiments, a PHPS $SiO_2$ precursor solution is coated on the surface of the absorptive coating 30 and heated at a temperature between 60-400° C.; 60-350° C.; 60-300° C.; 60-250° C.; 60-200° C.; 60-180° C.; 80-180° C.; 100-180° C.; 120-180° C.; 120-160° C.; or 140-160° C. in the air (e.g., in the presence of oxygen and water vapor) thereby forming the $SiO_2$ antireflection coating 40.

The thickness of the $SiO_2$ antireflection coating 40 can be tuned by appropriate adjustment of the concentration of the $SiO_2$ precursor in the second solvent, by modifying the coating conditions, e.g., the speed of the coating process, and/or successively applying more than one coating of the antireflection coating 40.

EXAMPLES

Example 1

In this example, a selective solar absorption coating is prepared following the procedures mentioned above. The solution-processed selective solar absorber comprises a silicon wafer substrate 10, a TiN infrared reflecting coating 20, an absorptive coating 30 comprising colloidal TiN ceramic nanoparticles 31, and a $SiO_2$ anti-reflection coating 40. First, a 200-nm-thick highly reflective TiN thin film is deposited on a 4-inch silicon wafer by reactive direct current sputtering. The base vacuum for the deposition is 6×10−6 torr. The DC power is 10 kW, the substrate temperature is 220° C., and the target is a high-purity (99.9%) Ti target. 150 SCCM Ar and 100 sccm $N_2$ are used as the deposition atmosphere. Commercial TiN ceramic nanoparticles with sizes of 20-30 nm are mixed with propylene glycol methyl ether acetate (PGMEA) to from a mixture, in which the weight ratio of TiN ceramic nanoparticles is 20%. The mixture is pre-dispersed by ultrasonic treatment for 1 hours. Then the pre-dispersed mixture is further treated by high-energy ball milling for more than 10 hours to obtain a homogeneous and well-dispersed colloidal TiN solution. $ZrO_2$ balls of 5 mm diameter are used as grinding medium. The weight ratio of the balls to the materials is 20:1. The milling speed is controlled at 700 rpm. 1 mL of the obtained colloidal solution is diluted by adding 9 ml of ethanol. A drop of the diluted colloidal TiN solution is spin-coated onto the TiN infrared reflecting coating at a speed of 6,000 rpm for 60 seconds to form the absorptive coating. The coating process is repeated one more time. After that, the prepared TiN absorptive coating is baked on a hotplate at a temperature of 150° C. for 5 minutes to evaporate the solvent. A drop of a PHPS solution (5% weight ratio) in dibutyl ether is deposited on top of the absorptive coating by spin-coating at a speed of 2,000 rpm for 60 s. The coating process is repeated one more time. The prepared PHPS coating is baked on a hotplate at a temperature of 150° C. for 5 minutes to evaporate the solvent, followed by a baking process at a higher temperature of 180° C. for 2 hours to form the $SiO_2$ anti-reflection coating. Finally, the solution-processed selective solar absorber is obtained.

Figure 3:
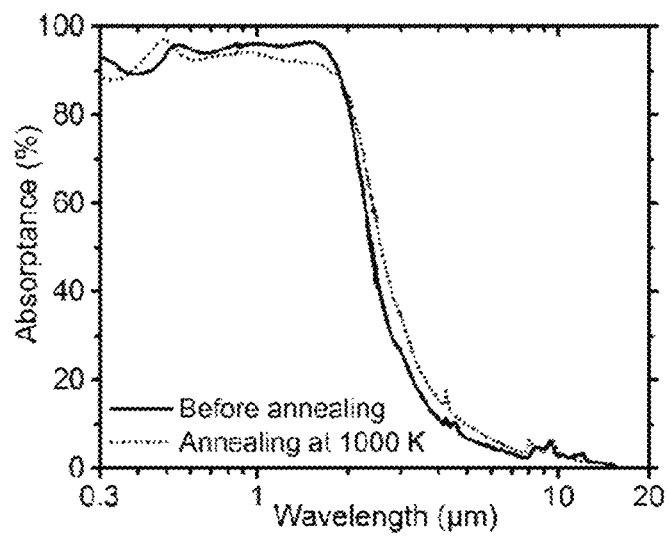
FIG. 3 shows absorption spectra of a solution-processed selective solar absorption coating before and after thermal annealing at 1,000 K for 150 hours in vacuum in accordance with certain embodiments described herein.

The absorptance spectrum of the selective solar absorber is shown in FIG. 3. The selective solar absorber is able to harvest the broad-spectrum sunlight with a high solar absorptance of 95%, while strongly reflecting the infrared light to attain a low thermal emittance of only 3% at 300 K and 22% at 1,000 K. Ultimately, a high solar-thermal energy conversion efficiency of 92% at 1,000 K under the illumination of 400 suns is achieved, which is the highest value reported so far for solution-processed selective solar absorbers. Thermal stability testing results show that the selective absorber is thermally stable after annealing at temperatures up to 1000 K in vacuum for 150 hours, as shown in FIG. 3. The water contact angle measurements show that the selective solar absorber with a $SiO_2$ coating has a contact angle of 90°. The overall performance of the selective solar absorber is comparable to that of the best-performance absorbers fabricated by high-vacuum techniques. However, the absorber by solution-based process is much simpler and cheaper than those high-vacuum nanofabrication methods conducted in cleaning rooms, which will largely reduce the cost in large-scale fabrication.

Example 2

In this example, a selective solar absorption coating is prepared following the procedures mentioned above. The solution-processed selective solar absorber comprises a polished stainless steel infrared reflecting coating 20 that also act as substrate, an absorptive coating 30 comprising colloidal TiN ceramic nanoparticles 31, and a $SiO_2$ anti-reflection coating 40.

Commercial TiN ceramic nanoparticles with sizes of 20-30 nm are mixed with propylene glycol methyl ether acetate (PGMEA) to from a mixture, in which the weight ratio of TiN ceramic nanoparticles is 20%. The mixture is pre-dispersed by ultrasonic treatment for 1 hours. Then the pre-dispersed mixture is further treated by high-energy ball milling for more than 10 hours to obtain a homogeneous and well-dispersed colloidal TiN solution. $ZrO_2$ balls of 5 mm diameter are used as grinding medium. The weight ratio of the balls to the materials is 20:1. The milling speed is controlled at 700 rpm. 1 mL of the obtained colloidal solution is diluted by adding 9 ml of ethanol. A drop of the diluted colloidal TiN solution is spin-coated onto the TiN infrared reflecting coating at a speed of 6000 rpm for 60 seconds. The coating process is repeated one more time thereby forming the absorptive coating. After that, the prepared TiN absorptive coating is baked on a hotplate at a temperature of 150° C. for 5 minutes to evaporate the solvent. A drop of a PHPS solution (5% weight ratio) in dibutyl ether is deposited on top of the absorptive coating by spin-coating at a speed of 2,000 rpm for 60 s. The prepared PHPS coating is baked on a hotplate at a higher temperature of 200° C. for 2 hours to form the $SiO_2$ anti-reflection coating.

Figure 4:
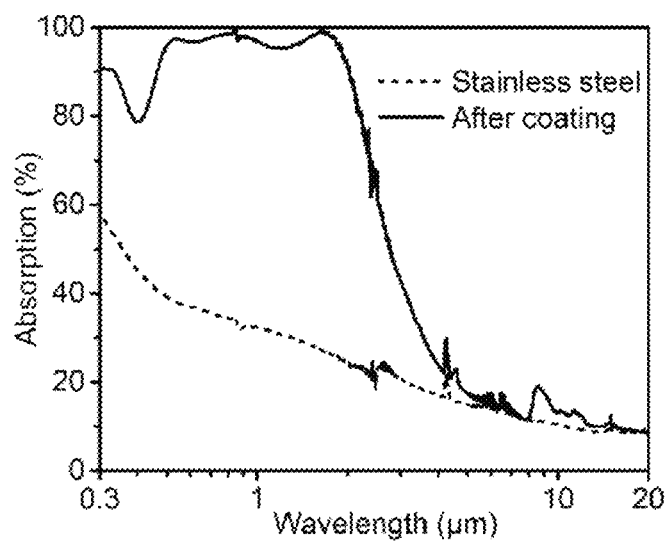
FIG. 4 shows absorption spectra of a solution-processed selective solar absorption coating on stainless steel substrate.

The absorptance spectra of the samples before and after coating selective solar absorber are shown in FIG. 4. The selective solar absorber is able to harvest the broad-spectrum sunlight with a high solar absorptance of 95%, while strongly reflecting the infrared light to attain a low thermal emittance of only 10% at 300 K.

REFERENCES

1. C. E. Kennedy, "Review of mid-to-high-temperature solar selective absorber materials" published in 2002 by the National Renewable Energy Laboratory, and also in the review article by L. A. Weinstein et al., "Concentrating solar power" published on the journal Chemical Reviews in 2015.
2. L. Kaluza et al., Solar energy materials & Solar cells, 2001, 70, 187-201
3. J. Vince et al., Solar energy materials & Solar cells, 2003, 79, 313-330; T. Bostrom et al., Solar energy, 2003, 74, 497-503.
4. T. Bostrom et al., Solar energy materials & Solar cells, 2007, 97, 38-43; X. Wang et al., Applied physics letters, 2012, 101, 203109.

What is claimed:

1. A selective solar absorption coating comprising:
   an infrared reflecting coating;
   an absorptive coating consisting of ceramic nanoparticles selected from the group consisting of $TiN_x$, $Al_wTi_zN$, $ZrN_x$, $Al_wZr_zN$, TiC, ZrC, $TiN_xC_y$, $ZrN_xC_y$, TIN, ZIN, $TiB_2$, and $ZrB_2$, and mixtures thereof disposed directly on a surface of the infrared reflecting coating, wherein $0<w<1$, $0.5 \le x \le 1.5$, $0 \le y \le 1$, and $0<z<1$; and
   a $SiO_2$ antireflection coating disposed directly on a surface of the absorptive coating, wherein the absorptive coating is prepared from solution-processable ceramic nanoparticles, wherein the selective solar absorption coating has a solar absorptance of 85-95%, with the proviso that the selective solar absorption coating does not comprise a cermet.
2. The selective solar absorption coating of claim 1, wherein the ceramic nanoparticles have an average diameter of 10-100 nm and a thickness of the absorptive coating is 10-500 nm.
3. The selective solar absorption coating of claim 1, wherein the infrared reflecting coating comprises at least one material selected from the group consisting of a metallic material and a ceramic material; and the infrared reflecting coating has a thickness greater than 50 nm.
4. The selective solar absorption coating of claim 1, wherein the $SiO_2$ antireflection coating has a thickness of 10-500 nm.
5. The selective solar absorption coating of claim 1 further comprising a substrate, wherein the infrared reflecting coating is disposed on the surface of the substrate.
6. The selective solar absorption coating of claim 1, wherein the selective solar absorption coating comprises:
   the infrared reflecting coating comprising at least one material selected from the group consisting of a metallic material and a ceramic material, wherein the infrared reflecting coating has a thickness greater than 50 nm;
   the absorptive coating disposed directly on a surface of the infrared reflecting coating, wherein the absorptive coating consists of ceramic nanoparticles selected from the group consisting of $TiN_x$, $Al_wTi_zN$, $ZrN_x$, $Al_wZr_zN$, TiC, ZrC, $TiN_xC_y$, $ZrN_xC_y$, $TiB_2$, and $ZrB_2$, wherein $0<w<1$, $0.5 \le x \le 1.5$, $0 \le y \le 1$, and $0<z<1$; the ceramic nanoparticles have an average diameter of 10-100 nm; and the absorptive coating has a thickness of 10-500 nm; and
   the $SiO_2$ antireflection coating disposed directly on the surface of the absorptive coating, wherein the $SiO_2$ antireflection coating has a thickness of 10-500 nm, wherein the absorptive coating and the $SiO_2$ antireflection coating are each independently prepared using solution-processable starting materials.
7. A solar thermal energy conversion system comprising the selective solar absorption coating of claim 1.
8. A method for preparing the selective solar absorption coating of claim 1, the method comprising:
   providing the infrared reflecting coating;
   applying a first solvent comprising the ceramic nanoparticles onto an exposed surface of the infrared reflecting coating thereby forming the absorptive coating disposed directly on the infrared reflecting coating; and
   depositing $SiO_2$ onto an exposed surface of the absorptive coating thereby forming the $SiO_2$ antireflection coating, wherein the first solvent applied uses a solution-based method.
9. The method of claim 8, wherein the solution-based method comprises at least one method selected from the group consisting of spin coating, spray coating, and painting.
10. The method of claim 8, wherein the ceramic nanoparticles have an average diameter of 10-100 nm and a thickness of the absorptive coating is 10-500 nm.
11. The method of claim 7, wherein the infrared reflecting coating comprises at least one material selected from the group consisting of metals and ceramics; and the infrared reflecting coating has a thickness greater than 50 nm.
12. The method of claim 8, wherein the $SiO_2$ antireflection coating has a thickness of 10-500 nm.
13. The method of claim 8, wherein the step of depositing $SiO_2$ on the surface of the absorptive coating comprises applying a second solvent comprising a $SiO_2$ precursor onto an exposed surface of the absorptive coating thereby forming a $SiO_2$ precursor coating disposed directly on the absorptive coating; and curing the $SiO_2$ precursor coating thereby forming the $SiO_2$ anti-reflection coating disposed directly on the absorptive coating.

14. The method of claim 13, wherein the $SiO_2$ precursor is perhydropolysilazane (PHPS) and the step of curing the $SiO_2$ precursor comprises reaction of PHPS with water and oxygen.

15. The method of claim 8, wherein the method comprises:
- providing the infrared reflecting coating;
- applying a first solvent comprising TiN ceramic nanoparticles onto an exposed surface of the infrared reflecting coating thereby forming the absorptive coating disposed directly on the infrared reflecting coating, wherein the TiN ceramic nanoparticles have an average diameter of 10-100 nm and a thickness of the absorptive coating is 10-500 nm;
- applying a second solvent comprising PHPS onto an exposed surface of the absorptive coating thereby forming a PHPS coating disposed directly on the absorptive coating; and
- contacting the PHPS coating with oxygen and water thereby forming the $SiO_2$ anti-reflection coating having a thickness of 50-500 nm disposed directly on the absorptive coating,
wherein each of the first solvent and the second solvent is independently applied using a solution-based method.

16. The method of claim 15, wherein each of the first solvent and the second solvent is independently an organic solvent.

17. The method of claim 15 further comprising the steps of: removing the first solvent at a temperature between 20-200° C. after the step of applying the first solvent comprising TiN ceramic nanoparticles onto an exposed surface of the infrared reflecting coating; and removing the second solvent at a temperature between 20-400° C. after the step of applying the second solvent comprising PHPS onto an exposed surface of the absorptive coating.

18. A selective solar absorption coating prepared according to the method of claim 15.

19. A selective solar absorption coating prepared according to the method of claim 8.

* * * * *